United States Patent
Kim

(10) Patent No.: US 8,830,598 B2
(45) Date of Patent: Sep. 9, 2014

(54) SUBMINIATURE OPTICAL SYSTEM

(75) Inventor: Tae Young Kim, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 21 days.

(21) Appl. No.: 13/603,660

(22) Filed: Sep. 5, 2012

(65) Prior Publication Data

US 2013/0063830 A1    Mar. 14, 2013

(30) Foreign Application Priority Data

Sep. 14, 2011  (KR) .......... 10-2011-0092585

(51) Int. Cl.
*G02B 9/14* (2006.01)

(52) U.S. Cl.
USPC ............ 359/787; 359/785; 359/723; 348/342

(58) Field of Classification Search
USPC ......... 359/644, 645, 650, 651, 657–661, 681, 359/682, 686, 687, 689, 690, 722, 723, 359/745–748, 754–758, 763, 764, 766, 359/771–774, 784–790; 348/336, 339, 342
See application file for complete search history.

(56) References Cited

U.S. PATENT DOCUMENTS

| 6,317,275 B1* | 11/2001 | Yoneyama ............ 359/748 |
| 2008/0007646 A1* | 1/2008 | Satori et al. ............ 348/360 |

FOREIGN PATENT DOCUMENTS

| KR | 10-2004-0050351 | 6/2004 |
| KR | 10-2010-0034064 | 4/2010 |

* cited by examiner

*Primary Examiner* — Darryl J Collins
*Assistant Examiner* — Gary O'Neill

(57) ABSTRACT

Disclosed herein is a subminiature optical system including: a first lens group having positive refractive power; a second lens group having negative refractive power; and a third lens group having positive refractive power, wherein the second lens group is configured of a plurality of lenses of which facing surfaces are bonded to each other and the following Conditional Equation is satisfied:

n1, n3 > 1.7    [Conditional Equation].

5 Claims, 3 Drawing Sheets

SPHERICAL ABERRATION

ASTIGMATISM

DISTORTION ABERRATION

SUBMINIATURE OPTICAL SYSTEM

CROSS REFERENCE(S) TO RELATED APPLICATIONS

This application claims the benefit under 35 U.S.C. Section 119 of Korean Patent Application Serial No. 10-2011-0092585, entitled "Subminiature Optical System" filed on Sep. 14, 2011, which is hereby incorporated by reference in its entirety into this application.

BACKGROUND OF THE INVENTION

1. Technical Field

The present invention relates to a subminiature optical system, and more particularly, to a subminiature optical system mounted in front of an automobile to implement a telephoto angle of view.

2. Description of the Related Art

Recently, mounting of a camera, which is an auxiliary unit for securing a field of view for a driver and allowing the driver to easily drive a vehicle, has increased at the time of manufacturing of the vehicle. In addition, cameras having various resolutions have been mounted according to a mounting position thereof.

A camera for a vehicle may be divided into a front camera and a rear camera according to a mounting position thereof and be divided into a visible camera and a monitoring camera according to a use object thereof.

Among them, the camera photographing a front image should implement a telephoto angle of view, and the camera photographing a rear image should implement a wide angle of view.

Here, the camera photographing a front image is generally configured of three or four sheets of lenses, such that it requires a bright optical system capable of performing photographing even in a low illumination environment while night driving.

The bright optical system as described above is generally designed to have a configuration (that is, a triplet structure) of three sheets of lenses: a first lens having positive refractive power, a second lens having negative refractive power, and a third lens having positive refractive power in order from an object side.

The configuration of three sheets of lenses as described above has advantages such as high mass productivity characteristics and a cheap cost, but also has a disadvantage such as a low resolution. Therefore, in order to improve a resolution, the second lens is divided into two sheets of lenses having positive refractive force or negative refractive force and spaced apart from each other by a predetermined interval, such that the optical system configured of a total of four sheets of lenses may be designed.

However, in this case, the entire length of the optical system may be increased. Therefore, an interval between the second and third lenses can not but be designed to be as narrow as possible, such that the possibility that scattered reflection will be generated becomes large and astigmatism and chromatic aberration become large.

SUMMARY OF THE INVENTION

An object of the present invention is to provide a subminiature optical system in which second lens group is configured by bonding two sheets of lenses to each other to minimize a change in a refractive index of light passing through a bonded lens to simplify an assembling process, thereby improving a yield.

Another object of the present invention is to provide a subminiature optical system in which a lens formed by bonding two lenses having different variance values to each other is disposed closely to an aperture stop to reduce axial chromatic aberration, thereby reducing a focus difference between images obtained at the time of day photographing and night photographing.

According to an exemplary embodiment of the present invention, there is provided a subminiature optical system including: a first lens group having positive refractive power; a second lens group having negative refractive power; and a third lens group having positive refractive power, wherein the second lens group is configured of a plurality of lenses of which facing surfaces are bonded to each other, the first and third lens groups have the refractive forces of 1.7 or more, respectively, and the second and third lens groups include a stop therebetween.

In a configuration of the second lens group, two lenses having different variance values are bonded to each other and the bonded lens is disposed closely to an aperture stop to reduce axial chromatic aberration, thereby making it possible to reduce a focus difference between images obtained at the time of day photographing and night photographing.

A band pass coating layer formed on the first lens group may pass light having a wavelength of 650 nm therethrough.

DESCRIPTION OF THE PREFERRED EMBODIMENTS

The acting effects and technical configuration for the objects of a subminiature optical system according to the present invention will be clearly understood by the following description in which exemplary embodiments of the present invention are described with reference to the accompanying drawings.

However, in the lens configuration diagrams according to the following exemplary embodiments, a thickness, a size, and a shape of the lens are slightly exaggerated for a detailed description of the present invention. Particularly, a shape of a spherical surface or an aspherical surface suggested in the lens configuration diagram is only an example. Therefore, the lens is not limited to the above-mentioned shape.

Figure 1:
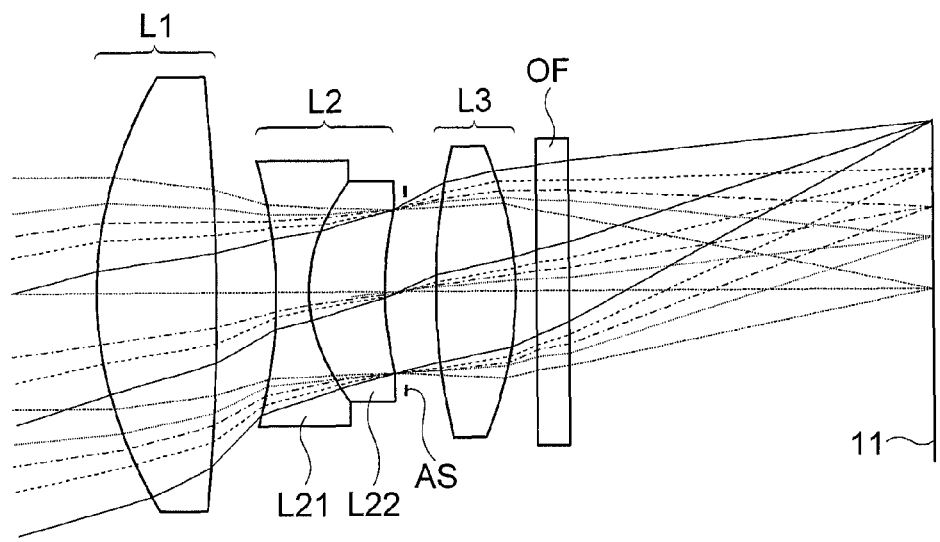
FIG. 1 is a configuration diagram of lenses of a subminiature optical system according to an exemplary embodiment of the present invention.

FIG. 1 is a configuration diagram of lenses of a subminiature optical system according to an exemplary embodiment of the present invention.

As shown in FIG. 1, the subminiature optical system according to the exemplary embodiment of the present invention may be configured to include a first lens group L1 having positive refractive power, a second lens group L2 having negative refractive power, and a third lens group L3 having positive refractive power in order from an object side, and an aperture stop AS installed between the second and third lens groups L2 and L3.

In addition, the subminiature optical system may include an optical filter OF provided between the third lens group L3 and an image surface 11, wherein the optical filter OF is configured of an infrared filter for blocking excessive infrared rays in light passing through the subminiature optical system or a cover glass coated with the infrared filter.

In the subminiature optical system according to the exemplary embodiment of the present invention, the aperture stop AS is disposed at the rear of the second lens group L2, that is, between the second and third lens groups L2 and L3 to allow light introduced through the first lens group L1 not to be blocked, thereby making it possible to easily secure a light amount and reduce the entire length.

In addition, the second lens group L2 through which the light is introduced into the aperture stop AS may be configured of a plurality of lenses L21 and L22 and be configured of a bonded lens so that facing surfaces of the lenses L21 and L22 are bonded to each other.

When the lenses configuring the second lens group L2 is configured of the bonded lens, a change in a refractive index of light passing through the plurality of lenses L21 and L22 is decreased, thereby making it possible to prevent scattered reflection and prevent a ghost phenomenon due to a strong light source such as a headlight of an oncoming vehicle at the time of night photographing through the subminiature optical system.

In addition, since the lenses configuring the second lens group L2 are assembled to each other in a state in which they are bonded to each other, the number of assembling processes may be reduced, and since an assembling tolerance between the lenses may be managed through an eccentric tolerance on the bonding surface of the second lens group L2, an assembling yield may be improved.

Further, chromatic aberration may be improved by the bonded lens of the second lens group L2. The chromatic aberration is improved as described above to reduce a focus difference between images obtained at the time of day photographing and light photographing, thereby making it possible to allow the night image to be easily identified, similar to the day image.

Meanwhile, an upper surface of a lens configuring the first lens group L1 may be provided with a band pass coating layer capable of passing light having a specific wavelength band, mainly a wavelength band of 650 nm therethrough.

Figure 3:
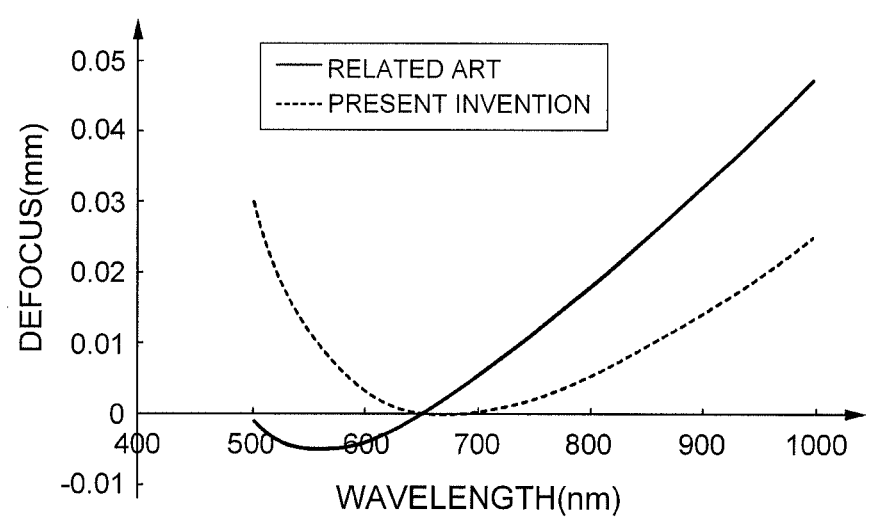
FIG. 3 is a diagram showing a form in which the subminiature optical system according to the exemplary embodiment of the present invention is defocused in a specific wavelength band.

Since axial chromatic aberration may be reduced by disposing the bonded lens of the second lens group L2 closely to the aperture stop AS, characteristics for defocus are improved in the subminiature optical system according to the exemplary embodiment of the present invention as compared to the optical system according to the related art, as shown in FIG. 3, such that a focal point is improved at the time of night image photographing, thereby making it possible to reduce a focus difference between the day image and the night image.

In the subminiature optical system according to the exemplary embodiment of the present invention having the above-mentioned configuration, the following Conditional Equation and an acting effect thereof will be described in more detail.

$$n1, n3 > 1.7 \quad \text{[Conditional Equation]}$$

Where n1 indicates refractive power of a lens configuring the first lens group and n3 indicates refractive power of a lens configuring the third lens group.

The above Conditional Equation is a conditional equation regarding aberration correction and a size of the optical system. In the case of deviating from a lower limit of the above Conditional Equation, the entire length of the optical system may be increased and it may become difficult to correct astigmatism.

Next, the subminiature optical system according to the exemplary embodiment of the present invention will be described in more detail through an example of a specific numerical value.

EXAMPLE

The following Table 1 shows examples of numerical values according to the exemplary embodiment of the present invention.

Figure 2A:
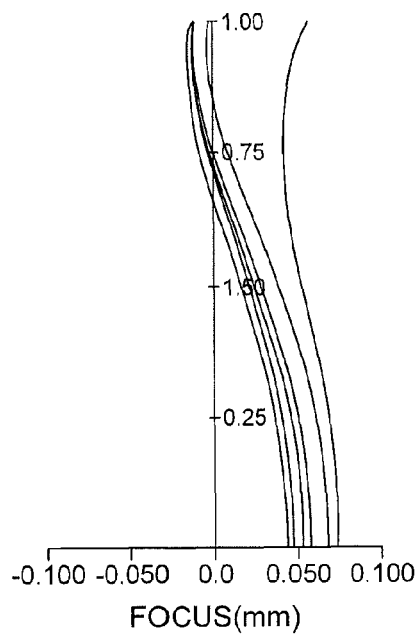
FIGS. 2A to 2C are diagrams showing aberration of the subminiature optical system shown in Table 1 and FIG. 1.
Figure 2B:
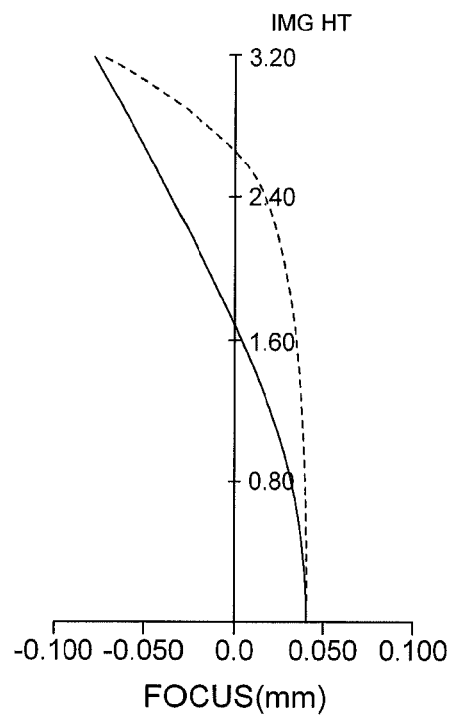
Figure 2C:
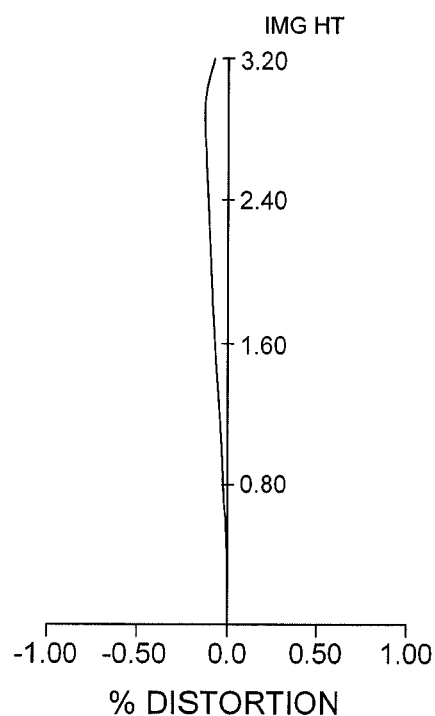

In addition, FIG. 1 is the configuration diagram of the lens showing lens disposition of the subminiature optical system according to the exemplary embodiment of the present invention; and FIGS. 2A to 2C show chromatic aberration, astigmatism, and distortion of the subminiature optical system shown in Table 1 and FIG. 1, respectively.

In the case of a first exemplary embodiment, FNO (brightness) is 2.5, a focal distance is 10.4 mm, and an HFOV (horizontal angle of view) is 26 degrees.

TABLE 1

| Surface No. | Radius of Curvature (R) | Thickness (t) | GLA |
| --- | --- | --- | --- |
| 1 | ∞ | 0 | |
| 2 | 7.128 | 2.13 | 804.3 |
| 3 | −55.000 | 1.11 | |
| 4 | −8.153 | 0.6 | 755.2 |
| 5 | 3.000 | 1.4 | 640.6 |
| 6 | 6.115 | 0.28 | |
| 7 | 12.955 | 1.46 | 804.4 |
| 8 | −6.263 | 6.60 | |

Here, the plurality of lenses L21 and L22 configuring the second lens group L2 are configured of the bonded lens.

As described above, in the subminiature optical system according to the exemplary embodiment of the present invention, the plurality of lens configuring the second lens group are configured of the bonded lens to reduce the astigmatism and the scattered reflection, thereby making it possible to reduce the focus difference between the images obtained at the time of the day photographing and the night photographing.

Further, according to the exemplary embodiment of the present invention, the second lens group is configured by bonding two lens having different variance values to each other and is disposed closely to the aperture stop, such that the axial chromatic aberration is reduced to pass the light having a specific wavelength band, thereby making it possible to reduce the focus difference between the images obtained at the time of the day photographing and the night photographing.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:
1. A subminiature optical system comprising:
a first lens group having positive refractive power;

a second lens group having negative refractive power,
  wherein an object-sided lens of the second lens group
  has concave surfaces on both sides, an image-sided lens
  of the second lens group is a meniscus type lens, and an
  image-sided surface of the object-sided lens and an
  object-sided surface of the image-sided lens are combined together without an air gap therebetween; and
a third lens group having positive refractive power,
wherein the following Conditional Equation is satisfied:

$$n1, n3 > 1.7 \qquad \text{[Conditional Equation]},$$

where n1 indicates refractive power of a lens configuring
  the first lens group and n3 indicates refractive power of
  a lens configuring the third lens group.

2. The subminiature optical system according to claim 1, further comprising a stop disposed between the second and third lens groups.

3. The subminiature optical system according to claim 1, wherein an upper surface of the first lens group is provided with a band pass coating layer passing light having a specific wavelength band therethrough.

4. The subminiature optical system according to claim 3, wherein the band pass coating layer passes light having a wavelength of 650 nm therethrough.

5. The subminiature optical system according to claim 1, wherein the subminiature optical system has a horizontal angle of view of 50 degrees or less.

\* \* \* \* \*